US010406686B2

(12) United States Patent
Boca et al.

(10) Patent No.: US 10,406,686 B2
(45) Date of Patent: Sep. 10, 2019

(54) BARE HAND ROBOT PATH TEACHING

(71) Applicants:Remus Boca, Simsbury, CT (US);
Srinivas Nidamarthi, Auburn Hills, MI (US); Thomas A. Fuhlbrigge, Ellington, CT (US)

(72) Inventors: Remus Boca, Simsbury, CT (US);
Srinivas Nidamarthi, Auburn Hills, MI (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/652,111

(22) PCT Filed: Dec. 13, 2013

(86) PCT No.: PCT/US2013/075012
§ 371 (c)(1),
(2) Date: Jun. 13, 2015

(87) PCT Pub. No.: WO2014/093822
PCT Pub. Date: Jun. 19, 2014

(65) Prior Publication Data
US 2015/0314442 A1 Nov. 5, 2015

Related U.S. Application Data

(60) Provisional application No. 61/737,246, filed on Dec. 14, 2012.

(51) Int. Cl.
*B25J 9/16* (2006.01)
(52) U.S. Cl.
CPC .......... *B25J 9/1664* (2013.01); *B25J 9/1656* (2013.01); *B25J 9/1697* (2013.01); *G05B 2219/35444* (2013.01)

(58) Field of Classification Search
CPC ....... B25J 9/1664; B25J 9/1656; B25J 9/1697
See application file for complete search history.

(56) References Cited

U.S. PATENT DOCUMENTS

| 4,945,493 | A | * | 7/1990 | Huang | .................. | B25J 9/1684 |
| | | | | | | 318/568.19 |
| 7,593,552 | B2 | * | 9/2009 | Higaki | .................. | G06F 3/017 |
| | | | | | | 382/103 |

(Continued)

FOREIGN PATENT DOCUMENTS

| EP | 1537959 B1 | 3/2010 |
| JP | 2003062775 A | 3/2003 |

(Continued)

OTHER PUBLICATIONS

International Search Report, International Patent Application No. PCT/US2013/075012, dated May 14, 2014, 3 pages.

(Continued)

*Primary Examiner* — Nicholas Kiswanto
(74) *Attorney, Agent, or Firm* — Taft Stettinius & Hollister LLP (57) ABSTRACT

A system for generating instructions for operating a robot to perform work on a workpiece has a 3D model or models of a robot scene that provides robot scene data. The system also has data of one or both hands of a gesture made with the one or both hands and a computation device that has program code configured to process the robot scene data and the gesture data to generate an instruction to operate the robot.

14 Claims, 10 Drawing Sheets

(56) References Cited

U.S. PATENT DOCUMENTS

| | | | | |
|---|---|---|---|---|
| 7,606,411 | B2* | 10/2009 | Venetsky | G06K 9/00355 |
| | | | | 345/475 |
| 8,965,576 | B2* | 2/2015 | Chen | B25J 9/0087 |
| | | | | 700/255 |
| 2010/0066676 | A1* | 3/2010 | Kramer | G06F 3/017 |
| | | | | 345/158 |
| 2011/0118752 | A1* | 5/2011 | Itkowitz | B25J 9/1689 |
| | | | | 606/130 |
| 2011/0288964 | A1* | 11/2011 | Linder | B25J 9/1689 |
| | | | | 705/27.1 |
| 2012/0061155 | A1* | 3/2012 | Berger | B25J 5/007 |
| | | | | 180/21 |
| 2013/0249786 | A1* | 9/2013 | Wang | G06F 3/011 |
| | | | | 345/156 |
| 2013/0343640 | A1* | 12/2013 | Buehler | B25J 9/0087 |
| | | | | 382/155 |
| 2015/0009124 | A1* | 1/2015 | Antoniac | G06F 3/017 |
| | | | | 345/156 |
| 2015/0293596 | A1* | 10/2015 | Krausen | B25J 13/02 |
| | | | | 606/130 |
| 2016/0303737 | A1* | 10/2016 | Rossano | B25J 11/005 |

FOREIGN PATENT DOCUMENTS

| | | |
|---|---|---|
| JP | 2011110620 A | 6/2011 |
| WO | 2005060338 A2 | 7/2005 |
| WO | 2011060171 A1 | 5/2011 |

OTHER PUBLICATIONS

European Examination Report, European Patent Application No. 13814788, dated Nov. 2, 2018, 7 pages.

Eberst C. et al., Towards Programming Robots by Gestures, Test-Case: Programming Bore Inspection for Small Lotsizes, May 2006 IEEE International Conference on Robotics and Automation, pp. 333-338.

Pedro Neto et al., Accelerometer-based Control of an Industrial Robotic Arm, Robot and Human Interactive Communication, 2009, The 18th IEEE International Symposium, Sep. 27, 2009, pp. 1192-1197.

* cited by examiner

BARE HAND ROBOT PATH TEACHING

FIELD OF THE INVENTION

This invention relates to the teaching of industrial robots to follow a path so that the robot can perform work.

DESCRIPTION OF THE PRIOR ART

An industrial robot is an automatically controlled, reprogrammable, multipurpose manipulator programmable in three or more axes. Examples of industrial robots are a robot located at a fixed position which is mobile by itself or mobile because the robot is mounted on a device that it is itself mobile such as a motorized vehicle or mounted on a track or gantry etc.

Hardware devices such as a teach pendant are now used by an operator to jog an industrial robot. The jogging teaches the robot points on a path that the robot follows when the robot performs work on a workpiece also sometimes referred to below as an object or part. By work is meant those actions performed by a robot such as painting, grinding, polishing, deburring, welding etc. that make a physical change to the workpiece and those interactions that a robot has with a workpiece such as picking up the workpiece from one location and moving it to another location or inserting the workpiece into a specific location that does not physically change the workpiece.

SUMMARY OF THE INVENTION

A system for generating instructions to a robot to perform work on a workpiece has:
   a 3D model or models of a robot scene providing robot scene data;
   data of one or both hands of a gesture made with the one or both hands; and
   a computation device having program code configured to process the robot scene data and the gesture data to generate an instruction for operating the robot to perform work on the workpiece.

DETAILED DESCRIPTION

Figure 1:
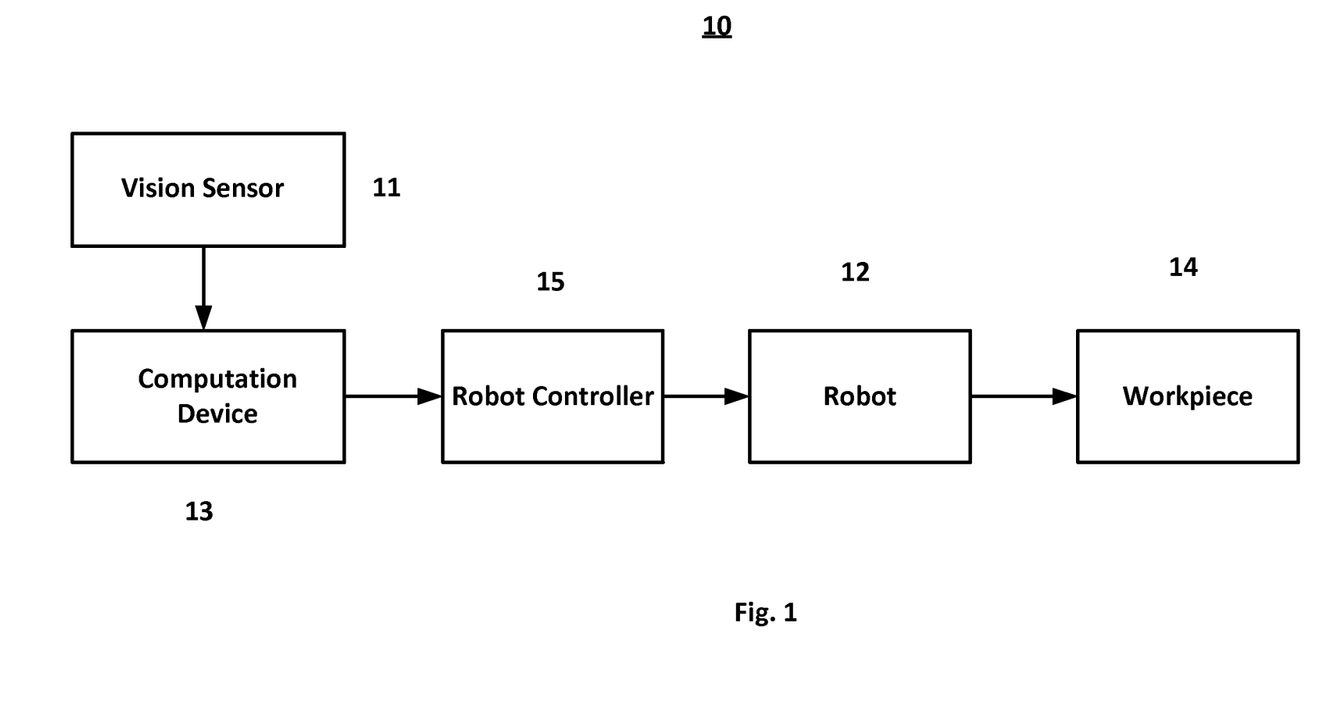
FIG. 1 shows a block diagram for a robot system with an industrial robot which is used to perform work on a workpiece.

Referring now to FIG. 1, there is shown a block diagram for a robot system 10 with an industrial robot 12 which is used to perform work on a workpiece 14. The robot 12 is an automatic machine with 'n' number of degrees of freedom.

System 10 also includes a vision sensor 11, a computation device 13 and a robot controller 15. The vision sensor 11 and computation device 13 can be in the same housing if sensor 11 is a smart sensor. The program to operate the industrial robot is in robot controller 15.

Figure 2A:
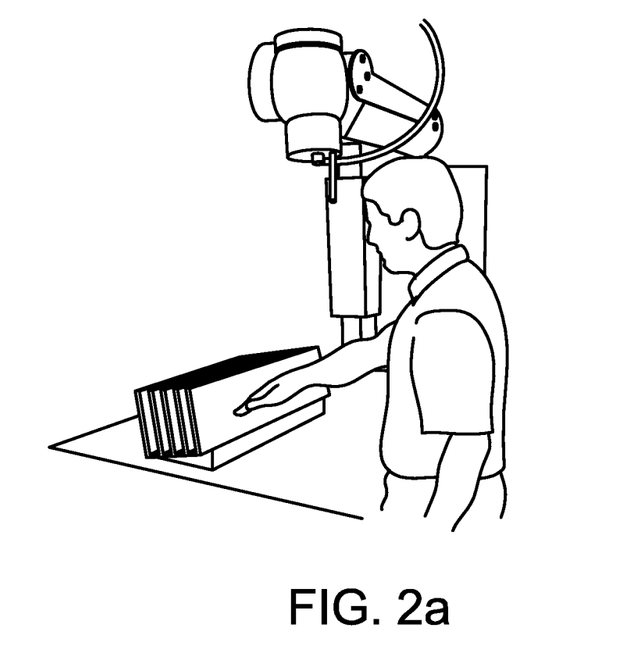
FIG. 2a shows an operator using hand gestures to point to a location in the robot workspace.

There is described below the use of hand gestures to teach a path to be followed by the industrial robot 12 in performing work on workpiece 14. As shown in FIG. 2a, an operator 16 uses hand gestures to point to a location in the robot workspace. The camera, which is a 3D vision sensor 11, is attached to the robot and takes an image of the hand gesture and the relationship of the operator's hand 16a to the workpiece 14. It should be appreciated that the workpiece 14 while shown in FIG. 2a may not be in the view seen by the camera. The workpiece image may have been taken at a different time and as is described below the image of the hand without the workpiece and the workpiece without the hand need to be referenced to a common coordinate system.

Figure 2B:
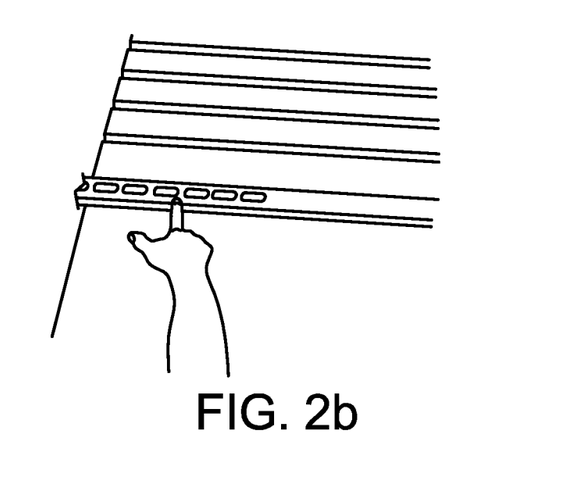
FIG. 2b shows one example of the image seen by the camera and the relationship of the operator's hand to the workpiece of interest.

FIG. 2b shows one example of the image and the relationship of the operator's hand 16a to the workpiece 14. The image is used by computation device 13 to calculate the corresponding location and orientation (robot target) on the part/scene of interest. The robot target is sent to the robot controller 15 or the computation device 13. This process is repeated until there are no more points to be taught to the robot 12.

There are stored in the computation device 13 the instructions to the robot 12 that will be assembled from the hand gestures from the one or two hands seen by the camera and as described herein the object being pointed to, that is the scene data to create the path and instructions to be followed by the robot 12 when the robot performs work on the workpiece 14. For example, one hand is used to teach a robot target and the other hand is used to generate a grab or drop instruction. It is up to the robot operator to associate a particular hand gesture with a particular instruction. There are no set rules for doing this.

Figure 2C:
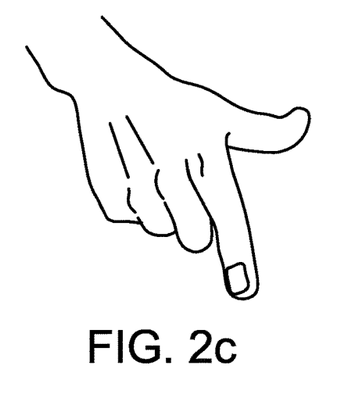
FIGS. 2c to 2j show examples of hand gestures.

For example, a right handed operator may like pointing with the index finger of that hand at a location on the workpiece with the right thumb in the raised position, as shown in FIG. 2c, as the gesture for the start instruction whereas a left-handed operator may use the same gesture with the left hand as the gesture for the start instruction. Of course, the employer of these two operators may impose its own rules to avoid confusion if one of the operators is associating gestures for a robot that will be used by the other of the operators. The same hand gesture used for the start instruction can also be used for the stop instruction.

It should be appreciated that it is the context in which the same hand gesture is used for two instructions that are the opposite of each other. For the start and stop instructions, the start instruction is generated first. Thus the first time that this same hand gesture is used for both the start and stop instructions it will be interpreted to mean the start instruction and the second time it is used it will be interpreted to mean the stop instruction.

In this context there will be other points along the path between the start and stop points at which the robot will perform work such as follow a path, pick up an object, drop an object and a unique gesture will be associated with each of these intermediate points. In some embodiments of the present method, the object that the finger points to might depending on the gesture be identified and thus a specific robot instruction can be generated. The present method in its simplest embodiment generates a robot target on the object.

Figure 2D:
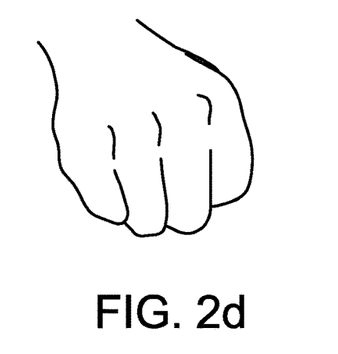
Figure 2E:
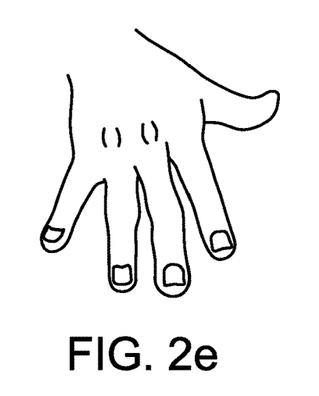
Figure 2F:
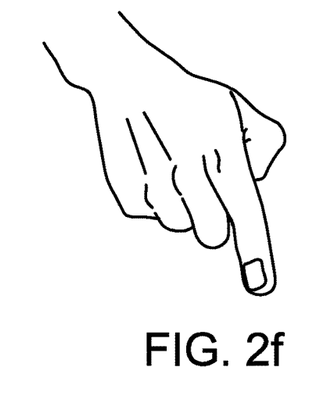

Examples of other hand gestures are shown in FIGS. 2d to 2j where for example but not limitation the gesture shown in FIG. 2d can be for the robot 12 to pick the object and the gesture shown in FIG. 2e can be for the robot 12 to drop the object. FIG. 2f shows the trigger gesture in which the index finger of the hand points to the object and the thumb is closed and opened which is a signal to generate a robot target instruction.

Figure 2G:
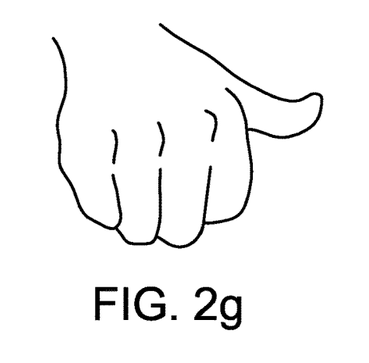
Figure 2H:
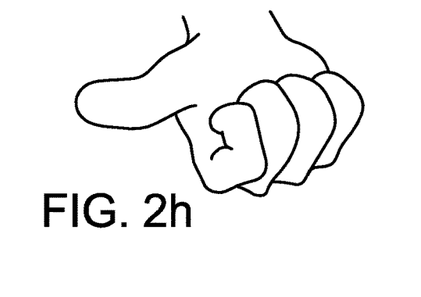

The gestures shown in FIGS. 2g and 2h can for example represent angles such as 0 degrees and 180 degrees as they do not have to represent specific instructions. These gestures can also represent motion of the camera 11, for example moving the camera from left to right, since in teaching the robot gestures can be used to reposition camera 11.

Figure 2I:
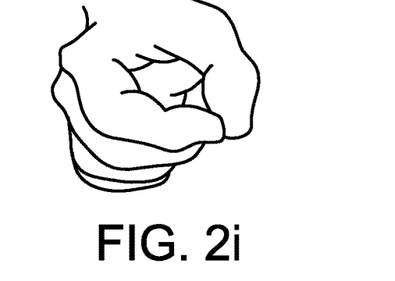
Figure 2J:
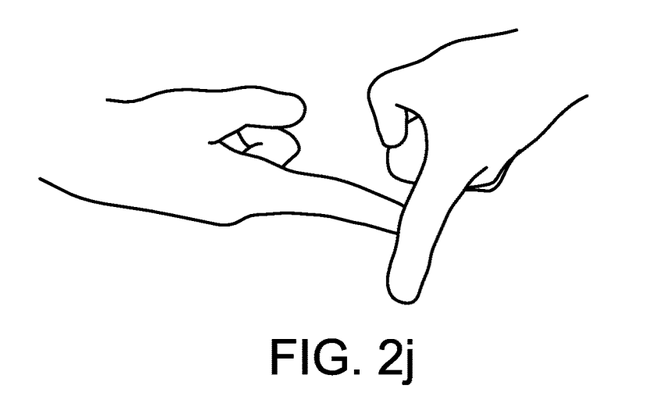

FIG. 2i shows the coordinate system hand gesture. FIG. 2j shows the two hand "T" gesture which indicates that a change of tool used by robot 12 is to take place. This gesture would be followed by the gesture, not shown, that indicates the tool number.

Figure 2K:
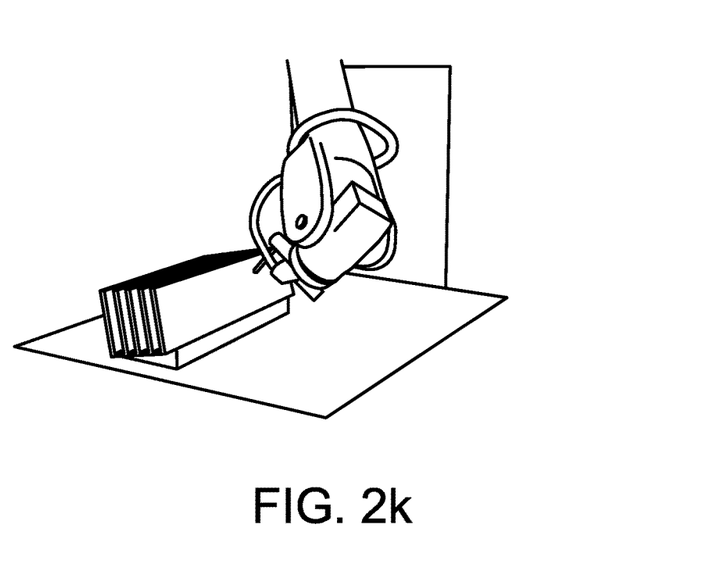
FIG. 2k shows a robot executing robot targets that are taught by using bare hands.

FIG. 2k shows a robot 12 executing robot targets that have been taught using bare hands.

Further the user of the robot may encode in the set of instructions in the computation device, instructions that are not in that device but are special to the application that the robot will be performing. As described above, it is up to the operator to associate a unique hand gesture with the special instruction.

There is a mapping between a hand gesture and a robot instruction. The user can associate one gesture with one or more instructions and one or more gestures with one instruction. This choice is up to the user. Behind the mapping might be a particular implementation for how the information from the gesture, scene and their context is used. It should be appreciated that not all gestures have to use a context but at least one gesture in a series of gestures has to use a context.

Figure 3:
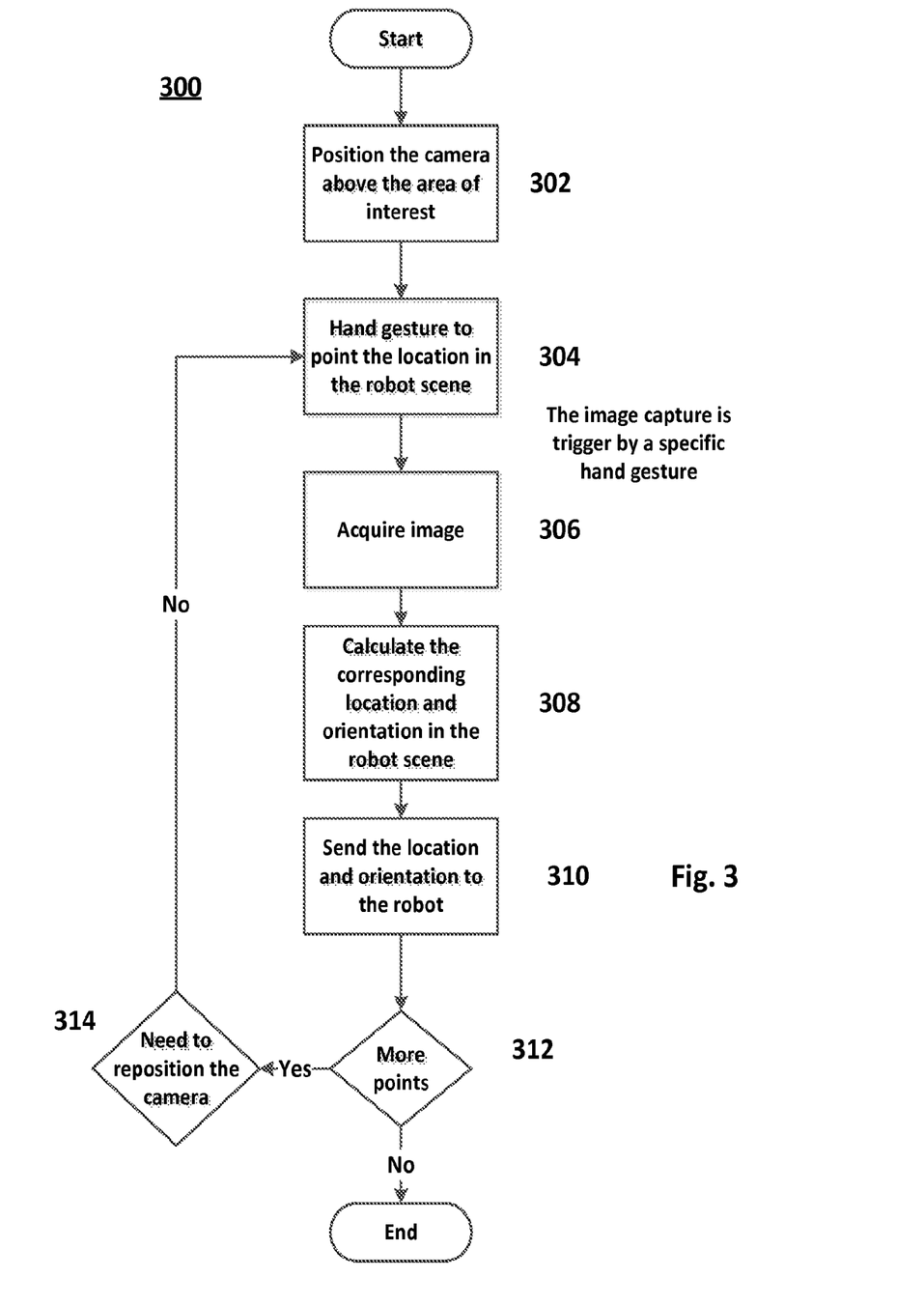
FIG. 3 shows a flowchart for a method that uses hand gestures to program a path that will be followed by an industrial robot when work is performed on an object.

Referring now to FIG. 3, there is shown a flowchart for a method 300 that uses hand gestures to program a path that will be followed by an industrial robot when work is performed on an object. At step 302 the operator positions the camera that is attached to the robot above the area of interest. At step 304 a hand gesture is made by the operator to point to a location in the robot scene. For example, if this location is the start point the operator can use the gesture shown in FIG. 2c if that gesture has previously been associated with the start instruction to teach that robot target. As should be appreciated, if the robot has to grab an object at that location, then another hand gesture such as that shown in FIG. 2d can be used to teach that function.

At step 306, the image of the location pointing hand gesture of step 304 and the associated location on the object are captured by the camera 11 and sent to the computation device 13 for processing. At step 308, the computation device 13 calculates from the image the corresponding location and orientation of the robot tool in the robot scene.

While not shown in flowchart 300, there may after step 302 of positioning the camera is performed be an optional step of acquiring an image of the robot scene without the operator's hand. This optional step is shown in dotted lines in the flowcharts 500 and 600 in FIGS. 5 and 6, respectively, and is described below. If the image of the robot scene without the operator's hand has occurred in flow 300, then at step 308 the corresponding location and orientation of the robot tool in the robot scene can be calculated by subtracting from the image with the hand acquired in step 306 the image of the scene without the hand to eliminate the hand.

Figure 5:
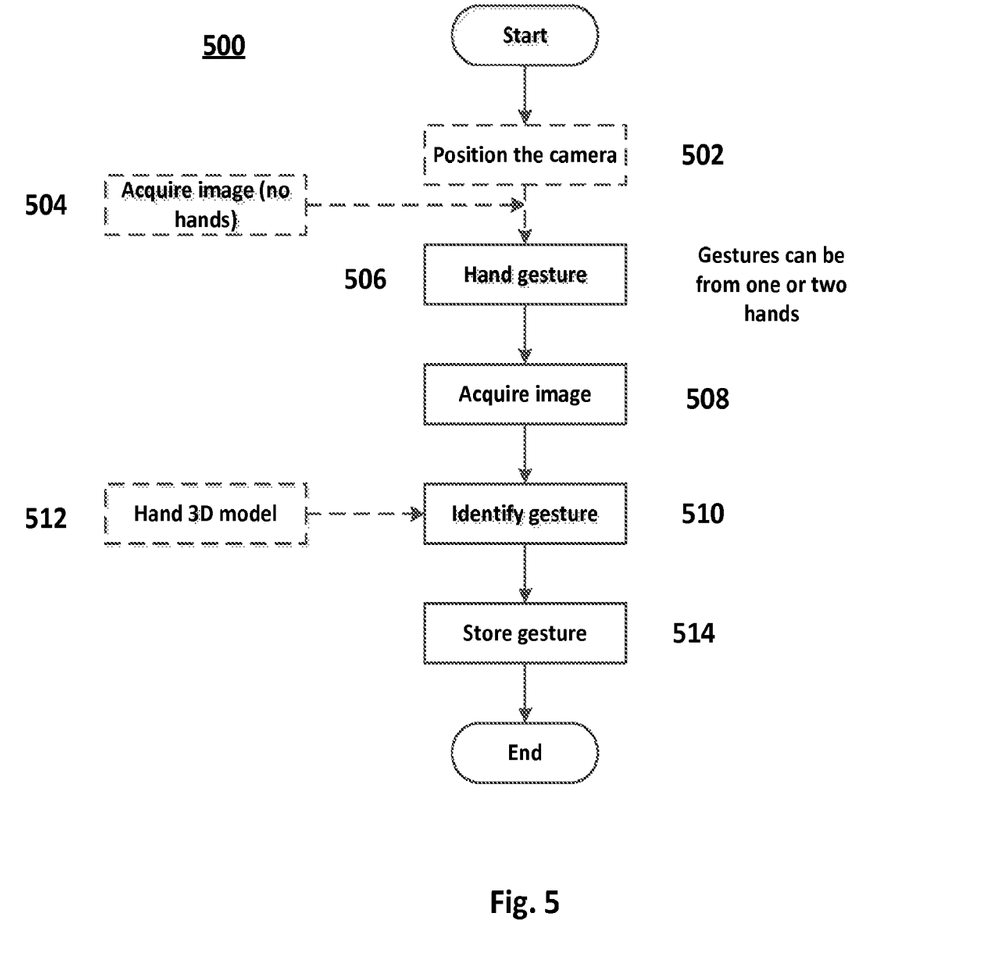
FIG. 5 shows a flowchart for one embodiment of a method that acquires and stores the operator's hand gestures.
Figure 6:
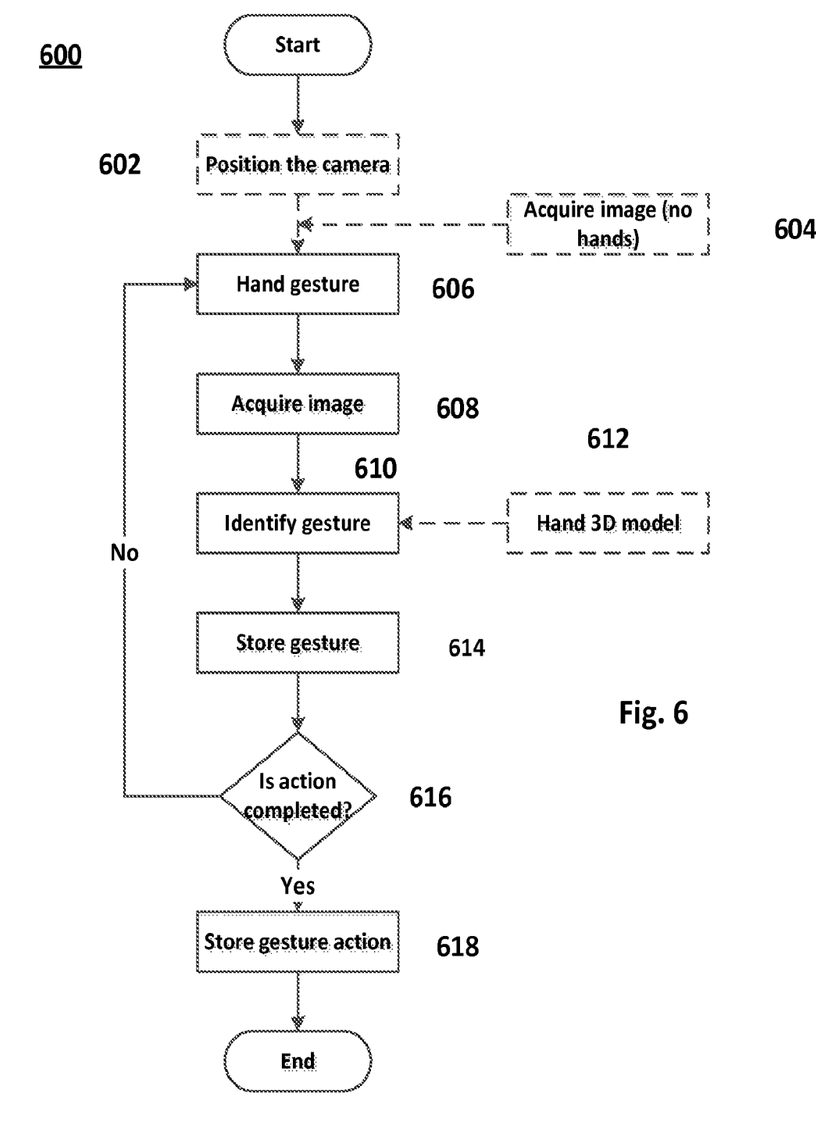
FIG. 6 shows a flowchart for the embodiment shown in FIG. 5 with an added instruction.

Another option not shown in FIG. 3, but is shown in dotted lines in the flowcharts in FIGS. 5 and 6, is to at step 308 use a 3D model of the operator's hand. The model is used to identify the gesture and calculate the gesture information (geometry and other properties such as deviation from a nominal position or so).

Both of the above optional steps may not be necessary as it may be possible to process the image with the hand acquired in step 306 to remove the hand without using an image that shows the hand or a 3D model of the hand.

In step 308, the hand and finger location and orientation can be used to calculate the corresponding location and orientation of the robot tool in the robot scene. One way to calculate the robot target is to intersect the finger direction with the scene data. This can be done by having an image of the scene or a CAD of the scene. It is understood that both gesture image and scene image (or CAD) are referenced in the same coordinate system and if they are not they can be transformed to a common coordinate system.

At step 310 the calculated location and orientation of the robot tool are sent to the computation device. Query 312 asks if more location points are needed to complete the robot path. Query 312 can be another gesture. If the answer is yes, the method 300 asks at query 314 if there is a need to reposition the camera. If the answer to query 314 is no, then the method 300 returns to step 304 where the operator makes the hand gesture associated with the next location point. While not shown in FIG. 3, if the answer to query 314 is yes, then the method 300 returns to step 302 where the camera is repositioned. If the answer to query 312 is no, then method 300 ends since no more robot path points have to be acquired.

While not shown in FIG. 3, the function performed by step 310 can be replaced with one of storage of the location and orientation information. If the answer to query 312 is that no more points have to be taught, then the taught points can be sent to the robot.

Figure 4:
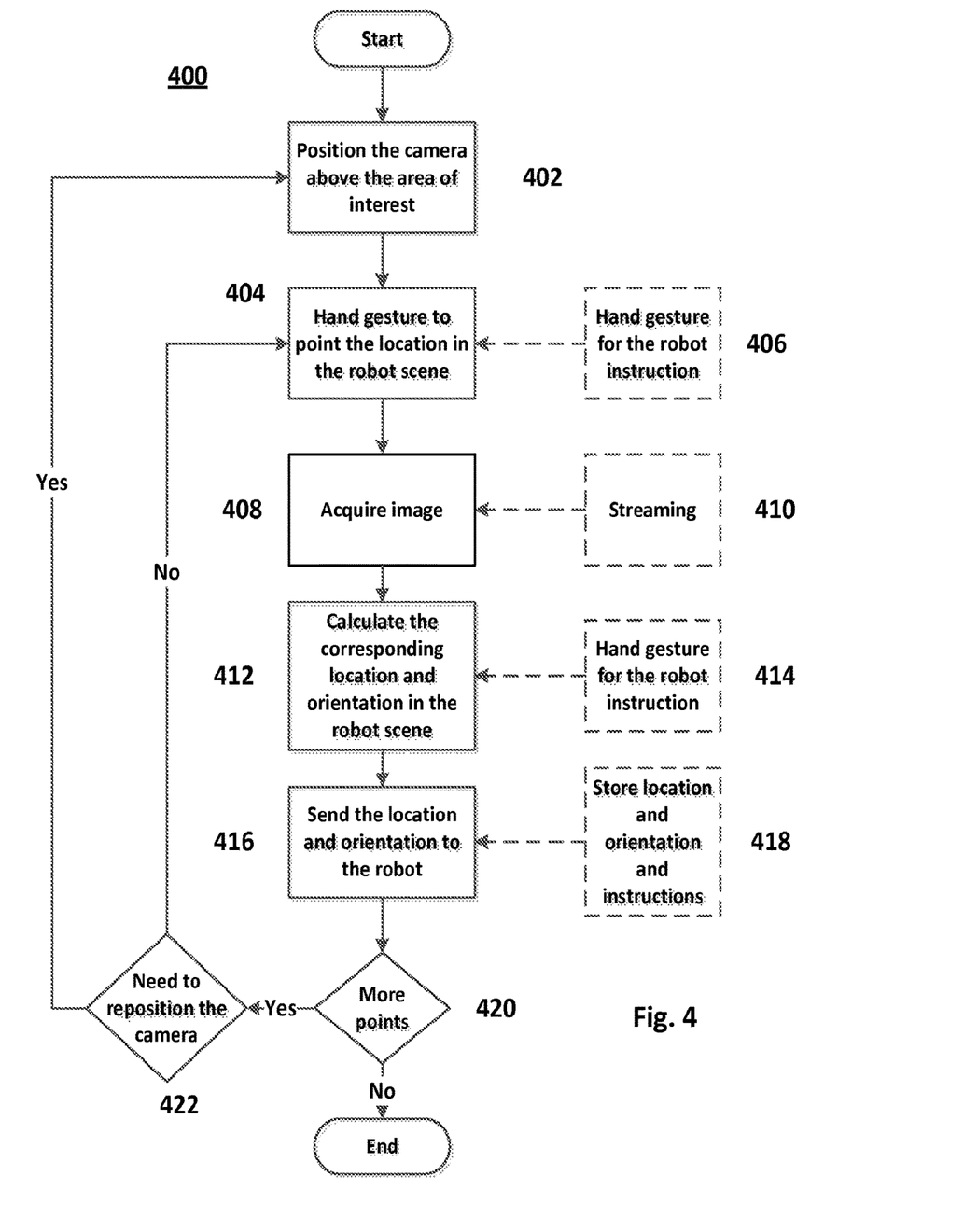
FIG. 4 also shows a flowchart for another method that also uses hand gestures to program a path that will be followed by an industrial robot when work is performed on an object.

Referring now to FIG. 4, there is a flowchart for another method 400 that also uses hand gestures to program a path that will be followed by an industrial robot when work is performed on an object. A comparison of the flowchart for method 400 with the flowchart described above for method 300 shows that some of the steps in both methods are the same. Therefore the description for those steps in method 400 is identical to the description for those steps in method 300 and thus those steps do not need to be described below.

Step 406 of a hand gesture for the robot instruction is optionally associated with step 404 and is therefore shown by dotted lines in FIG. 4. The robot instruction can for example be having the robot 12 grab an object at a particular location in the robot scene or drop an object that is held by the robot 12 at a particular location in the robot scene. It should be appreciated as described above, that the hand doesn't have to hold the object. The gesture of one hand can be used to represent the dropping of the object and the gesture of the other hand can show the location where the object is to be dropped.

Step 410 of streaming, that is continuously acquiring images as the hand moves across a desired path, is optionally associated with the input to acquire image step 408 and is therefore shown by dotted lines in FIG. 4. As can be appreciated, acquiring an image may in the absence of optional step 410, require a trigger to acquire the image. The continuous streaming of step 410 avoids the need for the trigger.

Step 414 of a hand gesture for the robot instruction is optionally associated with calculating step 412 and is therefore shown by dotted lines in FIG. 4. One example of using optional step 414 is that the gesture from one hand is used at step 412 to calculate the location and orientation and the gesture from the other hand can be a grab or drop instruction at step 414.

Step 418 of storing the location and orientation and robot instructions is optionally associated with step 416 and is therefore shown by dotted lines in FIG. 4. When step 418 is used, the stored locations and instructions can be used for simulation. In an alternate embodiment, step 418 replaces step 416 and in this case all robot instructions are sent to the robot 12 at once.

Referring now to FIG. 5, there is shown a flowchart for one embodiment of a method 500 that acquires and stores the operator's hand gestures. The first step 502 of positioning the camera is optional and is therefore shown by a dotted line in FIG. 5 because the camera may already be in the position needed to acquire the image. If not, then step 502 is not optional as the camera must be moved to that position.

Also optional as shown by the dotted lines is the step 504 of acquiring an image without any operator hands shown of the object to be worked on by the robot. The need for this image depends on the technique used to identify and calculate the gesture. For example, one technique may require an additional image without the hand and another technique may use the image with the hand.

At step 506 the operator makes a gesture which can be from one or two hands. At step 508 the image of the gesture is acquired and at step 510 the gesture is identified with a particular instruction for the robot and the gesture information is calculated or determined.

A 3D model of the operator's hand and/or a model of the joints in that hand at step 512 can be an optional input to step 510 if the model will be used to identify the operator's gesture(s).

At step 514, the identified gesture is stored in the memory of the computation device 13 or in the absence of such a device in the memory of the robot controller 15.

Referring now to FIG. 6, there is shown a flowchart for a method 600 that is essentially identical to method 500 described above as it has all of the steps in method 500 plus the added steps of query 616 after the store gesture step 614 and if the answer to query 616 is yes the step 618 of storing the gesture action. The principal difference between methods 500 and 600 is that method 500 is for acquiring a single gesture while method 600 is for acquiring a series of gestures that are for one gesture action. Thus as used herein, a series of gestures means one gesture action For example, triggering an image means moving the thumb down and up which are two gestures (the thumb movement up and down) that are associated with one gesture action which is the triggering of the image. All these gesture actions helps to calculate one robot target. The acquired image might be continuous streaming.

Figure 7A:
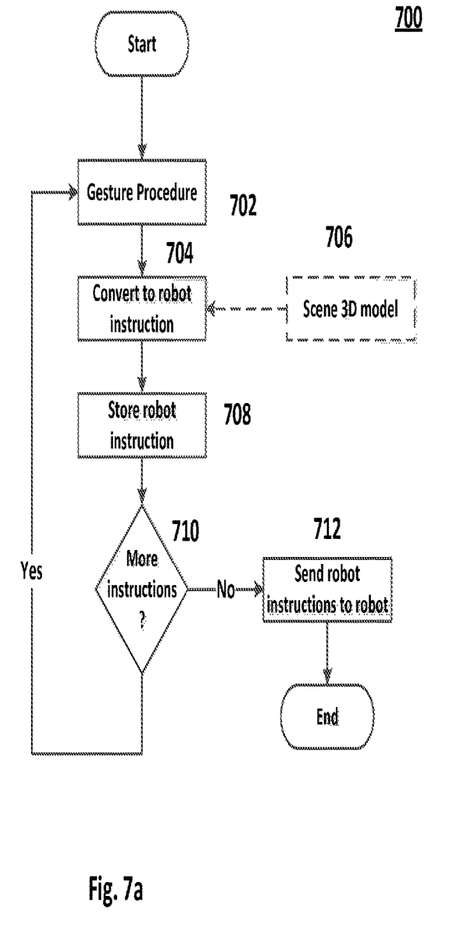
FIGS. 7a and 7b, shows flowcharts for two embodiments of a method for obtaining one or more gestures.
Figure 7B:
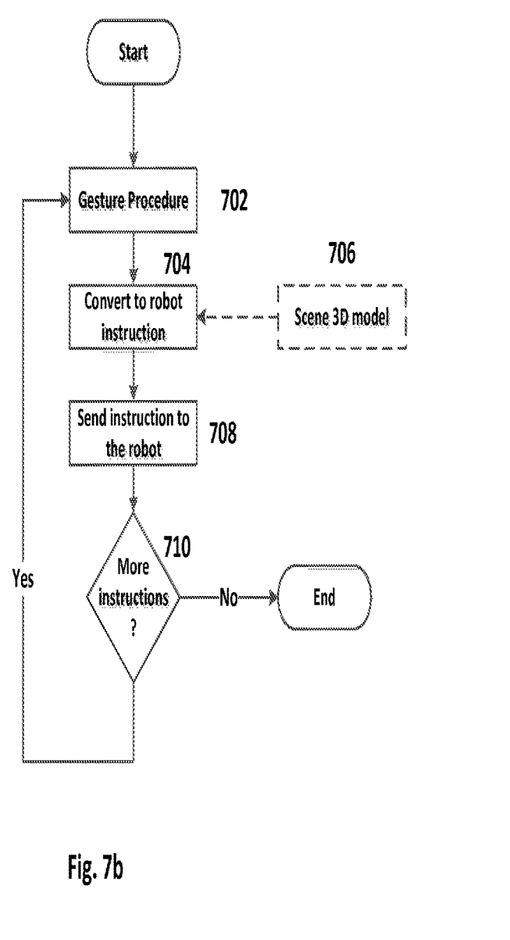

Referring now to FIGS. 7a and 7b, there are shown flowcharts for two embodiments of a method 700 for obtaining as shown in FIG. 7a one or more gestures (step 702—using the Gesture Procedures that are shown in the previously described FIGS. 5 and 6), creating robot instructions from the gestures by using the gesture context to the scene data from the same image or as additional data or extra processing to calculate/generate robot instructions (step 704 and optional step 706), storing the created instructions (step 708), asking if more created instructions are needed (step 710) and in step 712 sending the created instructions to the robot if no more created instructions are needed and performing in FIG. 7b all of the steps shown in FIG. 7a except the step 712 of sending the created instructions to the robot. The optional step 706 in these flowcharts of providing the scene 3D model to convert the gesture to a robot instruction step 704 is only needed if the scene will be subtracted from the image of the gesture.

Figure 8:
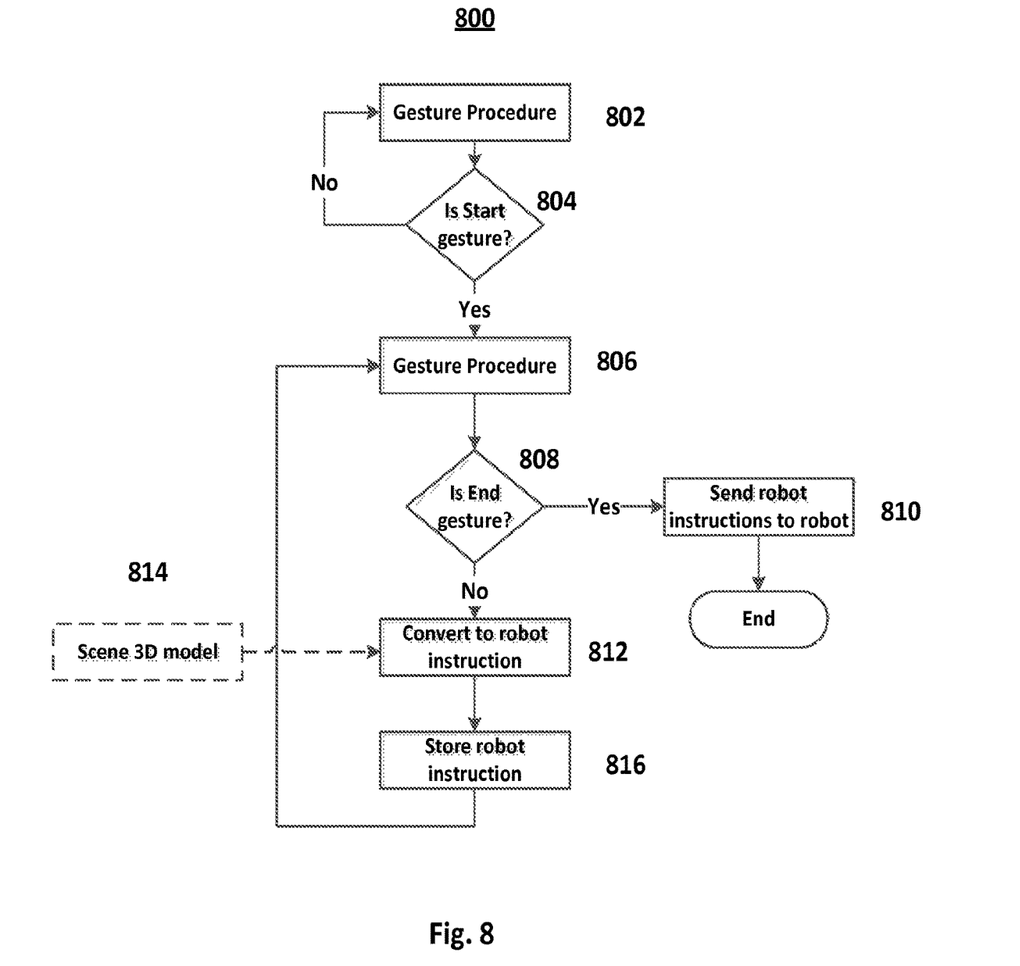
FIG. 8 shows a flowchart for a method of creating from the operator's gesture a set of instructions for operation of the robot that includes the recognition that the operator had made both the start and the end that is the stop gesture.

Referring now to FIG. 8, there is shown a flowchart for a method 800 of creating from the operator's gesture a set of instructions for operation of the robot that includes the recognition that the operator had made both the start gesture and the end that is the stop gesture. These gestures can as described above be the same gesture or they can be different gestures. That choice is left to the operator. If they are the same gesture, then as described above the context of the gesture information is used to know that the second time the same gesture is made that it is a stop because it is following a start.

The gesture acquisition procedure of step 802, that are shown in the previously described FIGS. 5 and 6, forms a loop with query 804 of determining if the operator has made the start gesture. If not, the method returns to the gesture acquisition procedure 802 until such time as the answer to query 804 is yes, that is, the gesture made by the operator is the start gesture.

If the answer to query 804 is yes, then the method proceeds to gesture acquiring procedure 806, that are shown in the previously described FIGS. 5 and 6, and the query 808 asks if the gesture acquired by procedure 806 is the end gesture. If the answer to query 808 is yes, then the method proceeds to step 810 where the set of instructions are sent to the robot controller.

If the answer to query 808 is no, then the acquired gesture which is not the end gesture is converted to a robot instruction. The use of the scene 3D model is as described above, optional for the conversion. Method 800 then proceeds to step 816 where the instructions are stored and then proceeds to gesture acquisition procedure 806 to acquire the next operator gesture.

In general a robot move instruction has information about the robot tool and coordinate system used for the robot target. There are other parameters such as speed and zone. Preferably the selecting of a robot tool or a coordinate system for a robot instruction can be done using procedures such as the procedures shown in method 600 of FIG. 6. The gestures for selecting the robot coordinate system or a robot tool examples of which are shown in FIGS. 2i and 2j respectively are complex gestures. As described above, the tool number is associated with a robot tool. Thus any parameter for any robot instruction can be taught. A library of gestures can be built for any parameter needed to be set with gestures.

It should be appreciated that:
while only one camera has been described herein that there may be more than one camera and the cameras do not have to repositioned if there is a network of cameras;
location and/or orientation (one or both) can be used by the robot and while usually it is the robot target location and orientation that are used the operator can use only one of the two;

location, orientation and associated action can be sent to the robot individually or all at once at the end of the teaching process;

other variants to trigger the image might include an auxiliary device as tablet pc or switch to provide an external trigger for the image acquisition;

with the image of the scene the part can be recognized and then the processing of the gesture has to be in relationship to the part;

the robot targets can be defined relative to a part coordinate system so that if the part is relocated at runtime the robot points do not have to be retrained, that is the coordinate system is recognized and the robot points are referenced to the part;

the robot target points can be refined after they are generated in an offline environment such as by using an offline simulator so that the desired path accuracy is met since the tip of finger may not be that accurate;

the human voice can be used to combine hand gestures actions for generating robot instructions voice such as for example saying start or stop as an external trigger;

the hand gestures can be enhanced with projectors or a laser line pointer to generate the robot instructions. For example one hand can point to an action such as pick or drop and the other hand can use a laser pointer instead of using a finger on that hand to calculate the robot target in the same manner as if the finger had been used;

the accuracy of the robot points can be enhanced by wearing tips on the fingers or using a stick or similar objects;

2D cameras can be used to obtain the 3D model but two or more 2D cameras have to be used to obtain that model;

one gesture can provide context for future gestures and the gesture and the scene or other element external to the gesture can be used to generate the one or more robot instructions; and the methods described herein to teach the robot points and robot paths are in general safe methods as the robot doesn't have to move when the human is in proximity to the robot but the human can move the robot at his or her option.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for generating instructions to a robot to perform work on a workpiece comprising:
   a non-transitory computer readable medium structured to store the following:
      a 3D model or 3D models of a robot scene providing robot scene data;
      a plurality of gesture data, each of said plurality of gesture data corresponding to one or more gestures made with one or both of a human's hands and a work operation that is to be performed by said robot on said workpiece, wherein said one or more gestures and said work operation for at least one of said plurality of gesture data is different than said one or more gestures and said work operation for another of said plurality of gesture data;
      one or more gestures and associated said work operation being different for each of said plurality of gesture data, wherein an index gesture of the one or more gestures includes an index finger of a hand pointing in a direction, said index gesture having a corresponding index gesture data from said plurality of gesture data; and
   a computation device having program code, the computation device configured to process said robot scene data and said plurality of gesture data, the computation device operable to:
      identify the index gesture data, using at least a detection of the index gesture, from the plurality of gesture data;
      generate, using the work operation of said index gesture data and the robot scene data, an index gesture instruction for operating said robot to perform work on said workpiece, where the index gesture instruction is formulated to enable movement of the robot to a point that corresponds to an intersection of a direction of the index finger with the workpiece, and
      output for said robot said index gesture instruction to control said robot to perform said work operation of said at least one selected gesture data on said workpiece.

2. The system of claim 1 wherein said one or more gestures made with one or both hands is a series of gestures, and wherein said computation device is operable to generate said instruction by assembling said work operation for each of said at least one selected gesture data for said series of gestures.

3. The system of claim 2 wherein said computation device is operable to recognize at least some of said gestures in said series of gestures provide an indication that a next at least one gesture is to be identified by said computation device as said at least one selected gesture data for use in generating said instruction.

4. The system of claim 1 further comprising one or more cameras, wherein said robot scene and said one or more gestures made with said one or both hands are received by said computation device in one or more images captured by said one or more cameras, and said computation device has program code configured to process said one or more images to obtain said robot scene data and identify said at least one selected gesture data.

5. The system of claim 1 further comprising one or more cameras wherein said robot scene and said one or more gestures made with said one or both hands, said one or more gestures referenced to said robot scene, are received by said computation device in separate images from said one or more cameras and said computation device has program code configured to process said separate images to obtain said scene data and identify said at least one selected gesture data.

6. The system of claim 1 wherein said instruction is used to operate said robot as soon as said instruction is generated by said computation device.

7. The system of claim 1 wherein said robot scene data is obtained by a vision system or computer added design data.

8. The system of claim 1 wherein said one or more gestures comprises two or more gestures made with one or both hands, and wherein said computation device is operable to assemble into the instruction each of said work operation for each of said at least one selected gesture data associated with said two or more gestures.

9. The system of claim 1 wherein said computation device is operable to identify the at least one selected gesture data from a detection of a single gesture made with one or both hands, and wherein said computation device is operable to generate with said robot scene data and said at least one selected gesture data for said single gesture two or more instructions to control said robot to perform said work operation on said workpiece.

10. The system of claim 1 wherein said one or more gestures made with one or both hands comprises a plurality of gestures, wherein each of said plurality of gestures are assigned to a particular instruction to operate said robot.

11. The system of claim 1 wherein said one or more gestures made with one or both hands is a series of gestures, and wherein said computation device is operable to output at least one instruction that controls said robot that is generated by said computation device from said robot scene data and data from said at least one selected gesture data for one of said one or more gestures in said series.

12. The system of claim 1 wherein said computation device is operable to identify said at least one selected gesture data associated with one of said hands holding an object when making said gesture and wherein said instruction outputted by said computation device causes said robot to hold said workpiece.

13. The system of claim 9 wherein said computation device is configured to output one of said two or more instructions to control the operation of said robot as soon as that one of said two or more instruction is generated by said computation device.

14. The system of claim 1, wherein said plurality of gesture data includes a first gesture data and a second gesture data, said one or more gestures being the same for said first gesture data and said second gesture data, said work operation of said first gesture data being different than said work operation of said second gesture data, and wherein said computation device is operable to identify either the first gesture data or the second gesture data as the at least one selected gesture data based on a context in which the said one more gestures is made.

* * * * *